United States Patent [19]

Eisemann

[11] 4,415,069

[45] Nov. 15, 1983

[54] BRAKING DEVICE FOR THE COVER OF A CHAMBER IN A RECORDING AND/OR REPRODUCING APPARATUS

[75] Inventor: Kurt Eisemann, Berlin, Fed. Rep. of Germany

[73] Assignee: U.S. Philips Corporation, New York, N.Y.

[21] Appl. No.: 255,922

[22] Filed: Apr. 20, 1981

[30] Foreign Application Priority Data

Jul. 16, 1980 [DE] Fed. Rep. of Germany ....... 3026909

[51] Int. Cl.³ .................... F16D 63/00; F16D 41/04; G11B 1/00
[52] U.S. Cl. .................................. 188/82.84; 16/337; 16/364; 188/381; 192/41 R; 192/48.92; 312/8; 312/328; 369/75.1
[58] Field of Search ............... 369/75, 79; 312/8, 327, 312/328; 16/364, 366, 337, 342; 188/82.1, 82.84, 381, 82.8; 192/41 R, 48.92

[56] References Cited

U.S. PATENT DOCUMENTS

| 1,214,403 | 1/1917 | Wright | 188/82.84 |
| 2,504,571 | 4/1950 | Noguera | 188/82.84 |
| 2,532,555 | 12/1950 | Kamler | 369/79 |
| 2,746,101 | 5/1956 | Lickteig | 16/362 |
| 3,196,480 | 7/1965 | Whittom | 312/8 |
| 3,231,927 | 2/1966 | Ammon | 312/8 |
| 3,281,152 | 10/1966 | Narutani | 369/79 |
| 3,431,040 | 3/1969 | Phelps et al. | 312/8 |

FOREIGN PATENT DOCUMENTS 2080602  2/1982  United Kingdom .............. 188/82.1

Primary Examiner—Steven L. Stephan
Attorney, Agent, or Firm—Joseph P. Abate

[57] ABSTRACT

A braking apparatus for the cover of a chamber in a recording and/or reproducing apparatus includes a stationary plate, a shaft connected to the plate and extending in a direction perpendicular therefrom, an actuating disc arranged on the shaft for rotation in a clockwise and a counterclockwise direction, a damping disc rotatably arranged on the shaft between the plate and the actuating disc, means for urging the discs simultaneously toward the plate and a silicone grease provided between the plate and the damping disc. The grease contacts both the plate and the damping disc. The braking apparatus further includes means for uniting the discs and providing simultaneous unidirectional damped rotation by the discs only when the actuating disc is rotated in the counterclockwise direction.

4 Claims, 3 Drawing Figures

BRAKING DEVICE FOR THE COVER OF A CHAMBER IN A RECORDING AND/OR REPRODUCING APPARATUS

BACKGROUND OF THE INVENTION

The invention relates to a device for controlling the speed of movement of the cover for a loading chamber of a recording and/or reproducing apparatus for information carriers such as discs or tapes. The cover is pivotally mounted on a stationary apparatus part about a pivot arranged at the rear side of the cover.

For controlling the speed of movement of covers of reproducing apparatus for disc-shaped information carriers, it is known to employ friction brakes. Normally, the covers have such a weight that they automatically return to the closed position. By means of friction brakes, it is possible to slow down this return movement. The friction brakes used for this purpose comprise either brake blocks or silicone-rubber rings which are, for example, secured to the chassis and traversed by a braking rod of the cover.

The known friction brakes generally operate with the same damping in both the direction of closing and of opening. However, there are cases in which the damping should be eliminated.

SUMMARY OF THE INVENTION

It is the object of the present invention to provide a braking apparatus for controlling the speed of movement of the cover for a loading chamber in a recording and/or reproducing apparatus. The inventive brake enables the speed of cover movement in one direction to be reduced by an increased damping and a high speed of movement to be obtained in the other direction because the damping is completely eliminated.

According to the invention this object is achieved in that, on a non-rotatable plate of the stationary apparatus part or the pivotal cover, there is arranged a damping disc which is rotatable relative to said plate, a mass of grease provided between the non-rotatable plate and the damping disc damps relative movements between them, the damping disc cooperates with an actuating disc via a freewheel device, which actuating disc is coaxial with the damping disc and rotatably coupled to on the stationary plate, and the actuating disc is force-coupled to the cover or stationary apparatus part without the non-rotatable plate.

By the use of a freewheel device, the damping which is effective in the one direction can be eliminated completely in the opposite direction. Thus, the speed of the cover movement is controlled depending on the direction of movement. The damping is then cancelled to such an extent that during freewheeling, the speed of movement cannot be influenced by the damping means incorporated in the braking device.

Specifically, the freewheel device is associated with the actuating disc and the damping disc and is constructed so that one side of the damping disc is formed with a shallow recess which adjoins the disc edge, the depth of the recess substantially corresponds to the thickness of a toothed disc accommodated in said recess, the tangential wall of the recess is oval such that the toothed disc is movable in the recess in a substantially tangential direction, the tangential wall of the recess is provided with a cam at the location of the larger diameter on one side, and the teeth of the toothed disc mesh with teeth of the actuating disc.

Thus, the freewheel device comprises the toothed disc which, during damping, engages with and is retained by the cam and thereby renders the damping operative and which, in the opposite direction runs completely free and does not influence the movements of the cover.

In a further embodiment of the invention, the damping device is constructed so that the damping disc comprises two parallel disc portions (damping disc-portion and freewheel disc-portion), between which a stationary spacer of the guide plate is arranged, and that, by means of a grease-filled bore, the damping disc-portion, which is arranged between the guide plate and the spacer, damps relative movements between the guide plate and the spacer on the one hand and the damping disc-portion on the other hand. The bore, which is for example filled with a damping material such as silicon grease, damps movements between the guide plate and the spacer on the one hand and the portion of the damping disc arranged between them on the other hand. The diameter of the bore and the number of bores filled with silicon grease determine the desired damping.

In accordance with a further embodiment of the invention, the cooperation of the adjusting disc with the toothed disc is obtained in a simple manner in that, at the location of the inserted toothed disc, the damping disc is surrounded by a raised ring on the edge of the actuating disc and that said ring is formed with inner teeth which mesh with the teeth of the toothed disc. Thus, the toothed disc is situated between the actuating disc and the damping disc and is forced to rotate along; the direction of rotation of the actuating disc determining the engagement or cooperation of the toothed disc with the cam.

BRIEF DESCRIPTION OF THE DRAWING

The invention will now be described in more detail with reference to the accompanying drawing, in which.

DESCRIPTION OF THE PREFERRED EMBODIMENTS

Figure 1:
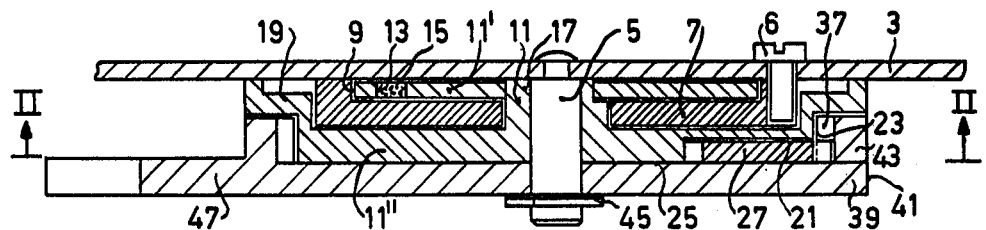
FIG. 1 is a sectional view through the device in accordance with the invention.

The device in accordance with the invention is secured to a guide plate 3 which may be arranged on a stationary apparatus part such as the chassis of the recording and/or reproducing apparatus or on the pivotal cover by means of a shaft or rivet 5. On the rivet, which is secured to the guide plate 3 and is extended in a direction generally perpendicular therefrom, several discs are arranged. First of all there is provided a spacer 7 which is non-rotatably connected to the guide plate by means of screws 6 spacer ensures that a clearance 9 is obtained between said spacer and the guide plate 3. A damping disc (member) 11 is rotatably arranged on the rivet 5 and is adjacent the plate 3. The disc comprises two disc portions 11′ and 11″. The two disc portions 11′ and 11″ are rigidly connected to each other. The disc portion 11′ constitutes a damping disc-portion which is situated in the clearance 9. The damping disc-portion 11′ is formed with at least one bore 13 which, for example, extends from the plate 3 to the spacer 7 and which is filled with silicone grease 15. The disc portion 11″, which functions as a freewheel disc-portion, is spaced from the guide plate and the spacer by means of a bushing 17 which is integral with it. The freewheel disc-portion 11″ surrounds the spacer 7 with a raised collar 19 and engages with the guide plate 3 outside said disc portion. This ensures a correct tilt-free guidance of the damping disc 11 on the guide plate 3.

In the portion of the damping disc which serves as freewheel disc 11″ a recess 21 is formed. This recess adjoins the periphery or edge 23 of the damping disc. The recess 21 is shallow and is machined in the damping disc 11 from the underside 25. The depth of the recess 21 substantially corresponds to the thickness of a toothed disc 27 accommodated therein. A tangential wall 29 (FIG. 2) of the recess has an oval shape such that the toothed disc can be moved in the recess in a substantially tangential direction as is indicated by the line 31, in FIG. 2. On the line 31 a cam 33 is situated which extends into the recess from the wall 29 at a location of the larger diameter on one side of the recess. The teeth 35 of the toothed disc continuously mesh with a plurality of teeth 37 of provided on an actuating disc 39.

The actuating disc 39 is situated underneath the damping disc 11 (or its portion constituting the freewheel disc-portion 11″) and continuously urges the toothed disc 27 into the recess 21. On the periphery 41 of the actuating disc 39, there is provided a raised ring 43, which carries the inner teeth 37. Thus, the teeth 37 are adjacent the edge 23 and the recess 21.

A retaining ring 45 fitted onto the rivet 5 urges the actuating disc 39 and the damping disc 11 against the guide plate 3. On the actuating disc there is provided an actuating portion 47 which is visible in FIG. 1 and represented by dashed lines in FIG. 2 because it is situated outside the sectional view II—II.

Figure 3:
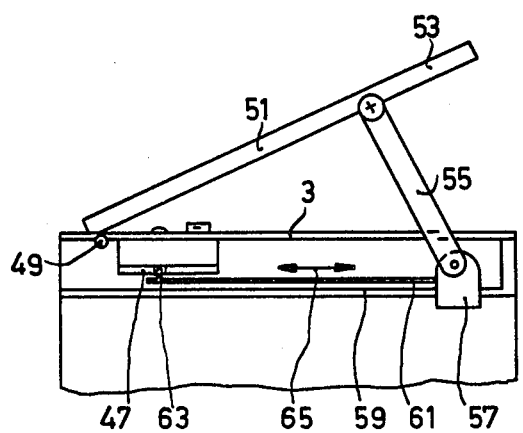
FIG. 3 schematically represents the device incorporated in a recording and/or reproducing apparatus.

As is shown in FIG. 3, a cover 51 is pivotally arranged on the guide plate 3 via a pivot 49. The guide plate 3 also carries the device of FIG. 1. At its front portion 53, the cover 51 is supported by a sliding rod 59 via a support 55 and a slide member 57. The slide member 57 is slidable on the sliding rod 59. The sliding member 57 also carries an actuating rod 61 which engages with the portion 47 by means of a pin 63. In the case of a to and fro movement in the direction of the double arrow 65, the device in accordance with the invention freewheels in the one direction and damps the movements of the cover 51 in the other direction.

Figure 2:
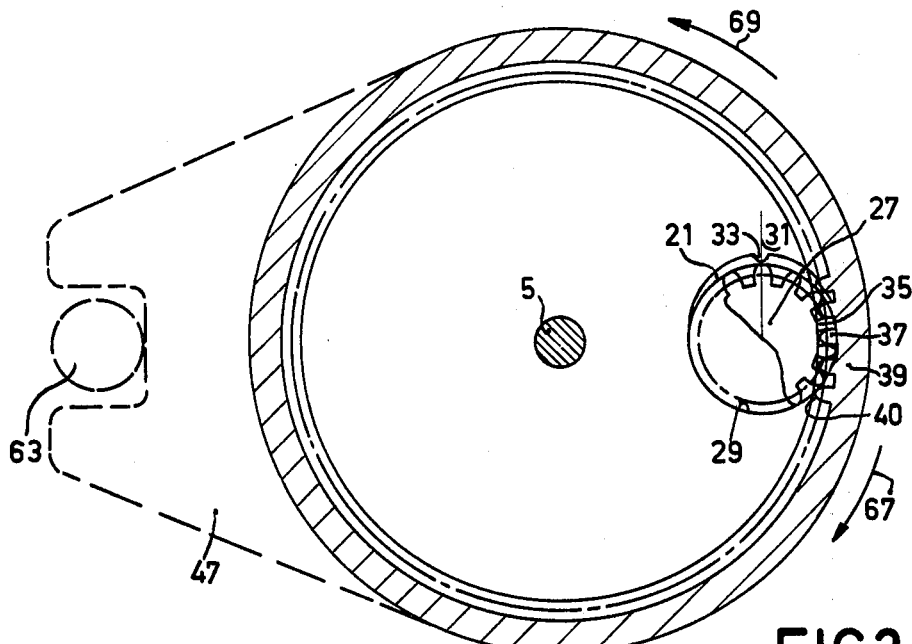
FIG. 2 is a sectional view through the representation of FIG. 1 taken on the line II—II in FIG. 1.

The device in accordance with the invention operates as follows. If the actuating disc or first member 39 is rotated in the direction of an arrow 67, for example the clockwise direction, as shown in FIG. 2, via the pin 63, the teeth 37 engage with the teeth 35 and the toothed disc 27 passes freely over the wall 29 of the recess 21. This is the freewheeling situation in which the cover is easily movable. Normally this will be the closing movement. When the actuating disc 39 is rotated in the opposite direction by means of the pin 63, namely in the direction of an arrow 69, for example the counterclockwise direction, the toothed disc 27 engages with the cam 33 with its teeth 35 and the toothed disc 27 is thus blocked against rotary movements. This means that a formcoupling interlocking or uniting is established between the actuating disc 39 and the freewheel disc-portion 11″. Thus, the actuating disc 39 moves the freewheel disc-portion 11″ and at the same time rotates the damping disc-portion 11′ simultaneous unidirectional rotation. It is clear from the figures that the actuating disc rotates in clockwise and counterclockwise directions lying in a first plane generally transverse of the shaft 5 while the damping disc rotates at least in a counterclockwise direction lying in a second plane parallel to the first plane. The first and second planes are both generally parallel to the plate 3. Owing to the silicone grease filling in the bore 13, the rotary movement relative to the guide plate is dampled by the silicone grease. Thus the cover can only be moved slowly and this movement will generally be the lifting movement for opening the apparatus.

While there has been shown and described what is at present considered the preferred embodiment of the inventive braking apparatus, it will be apparent to those skilled in this art that various changes and modification may be made therein without departing from the spirit and scope of this invention which shall be limited only by the appended claims.

What is claimed is:

1. A braking device, comprising:
a non-rotatable plate;
a shaft connected to said plate and extending generally in a direction perpendicular therefrom;
a first member rotatably arranged on said shaft, for movement in a first direction and in a second direction opposite to said first direction, said first member directions lying in a plane generally transverse of said shaft;
a second member coaxial with said first member and rotatably arranged on said shaft between said plate and said first member, for movement in a plane parallel to said first member plane;
a damping material provided between said plate and said second member, said plate and said second member being arranged such that said material contacts both said plate and said second member;
means, associated with said shaft, for urging said first and said second members simultaneously toward said plate; and
means, associated with said first and said second members, for uniting said first and said second members and providing simultaneous unidirectional rotation by said first and said second members only when said first member is rotated in said first direction, whereby said unidirectional rotation is damped by said material between said plate and said second member,
characterized in that said second member includes a damping disc having an edge, said first member includes an actuating disc coaxial with said damping disc, and
said uniting and providing means includes a recess provided in said damping disc and a plurality of teeth provided on said actuating disc, said recess adjoining said edge and having a shallow depth, said teeth being adjacent said edge and said recess, and said uniting and providing means further includes a toothed disc accomodated within said recess, said teeth of said toothed disc being meshed with said teeth of said actuating disc, said toothed disc having a thickness substantially corresponding to said depth of said recess, said recess being partly formed by an oval-shaped wall tangential to said toothed disc, and said wall being provided with a cam on a diameter of said recess, so that said toothed disc moves along said diameter toward said cam when said first member rotates in said first direction.

2. A device as claimed in claim 1, wherein said second member includes a damping disc portion fixed to a freewheel disc portion, and said device further comprises a stationary spacer fixed to said plate and disposed between said damping disc portion and said freewheel disc portion, said damping disc portion including at least one bore extending from said plate to said spacer, said bore containing said damping material.

3. A device as claimed in claim 1, wherein said damping material is a silicone grease.

4. A device as claimed in claim 1, wherein said actuating disc includes a periphery and a raised ring provided on said periphery, said ring being provided with said teeth which mesh with said toothed disc.

* * * * *